(12) United States Patent
Rohner et al.

(10) Patent No.: US 7,847,442 B2
(45) Date of Patent: Dec. 7, 2010

(54) LINEAR MOTOR

(75) Inventors: Ronald Rohner, Widen (CH); Marco Hitz, Kleinboesingen (CH); Daniel Ausderau, Frauenfeld (CH)

(73) Assignee: NTI AG, Spreitenbach (CH)

( * ) Notice: Subject to any disclaimer, the term of this patent is extended or adjusted under 35 U.S.C. 154(b) by 0 days.

(21) Appl. No.: 12/420,282

(22) Filed: Apr. 8, 2009

(65) Prior Publication Data

US 2009/0261664 A1    Oct. 22, 2009

(30) Foreign Application Priority Data

Apr. 22, 2008    (EP)    ................... 08154971

(51) Int. Cl.
*H02K 41/02*    (2006.01)
(52) U.S. Cl. ................ 310/12.14; 310/23; 310/24; 310/34; 310/35
(58) Field of Classification Search .............. 310/12.21, 310/12.01, 12.19, 12.22, 23, 24, 35, 12.14; *H02K 41/02*
See application file for complete search history.

(56) References Cited

U.S. PATENT DOCUMENTS

| | | | | |
|---|---|---|---|---|
| 509,705 A | * | 11/1893 | Threlfall ..................... 318/122 |
| 2,686,280 A | * | 8/1954 | Strong et al. ................. 318/125 |
| 3,234,491 A | * | 2/1966 | Baur ........................... 336/30 |
| 3,698,775 A | * | 10/1972 | Gilbert ....................... 310/90.5 |
| 4,159,636 A | | 7/1979 | Jicha et al. |
| 4,785,816 A | * | 11/1988 | Dow et al. ................... 600/446 |
| 5,440,183 A | * | 8/1995 | Denne ...................... 310/12.26 |
| 5,796,194 A | * | 8/1998 | Archer et al. ............. 310/68 B |
| 5,949,161 A | | 9/1999 | Nanba |
| 2001/0028248 A1 | * | 10/2001 | Nekado ....................... 324/312 |
| 2005/0116550 A1 | * | 6/2005 | Yajima et al. .................. 310/14 |
| 2006/0214517 A1 | * | 9/2006 | Ng et al. ........................ 310/12 |
| 2006/0244337 A1 | * | 11/2006 | Makita et al. ................ 310/257 |

FOREIGN PATENT DOCUMENTS

| | | |
|---|---|---|
| FR | 2 387 435 A | 11/1978 |
| GB | 1 307 833 A | 2/1973 |
| GB | 2 291 937 A | 2/1996 |

* cited by examiner

*Primary Examiner*—Quyen Leung
*Assistant Examiner*—Terrance Kenerly
(74) *Attorney, Agent, or Firm*—Townsend and Townsend and Crew, LLP

(57) ABSTRACT

In a linear motor (1) having a stator (2) and an armature (3), the stator (2) comprises a winding former (21) and a drive winding (22) provided on the winding former (21). Further, means are provided for preventing any contact between the drive winding (22) and the armature (3) in case the armature (3) penetrates through the winding former (21).

11 Claims, 4 Drawing Sheets

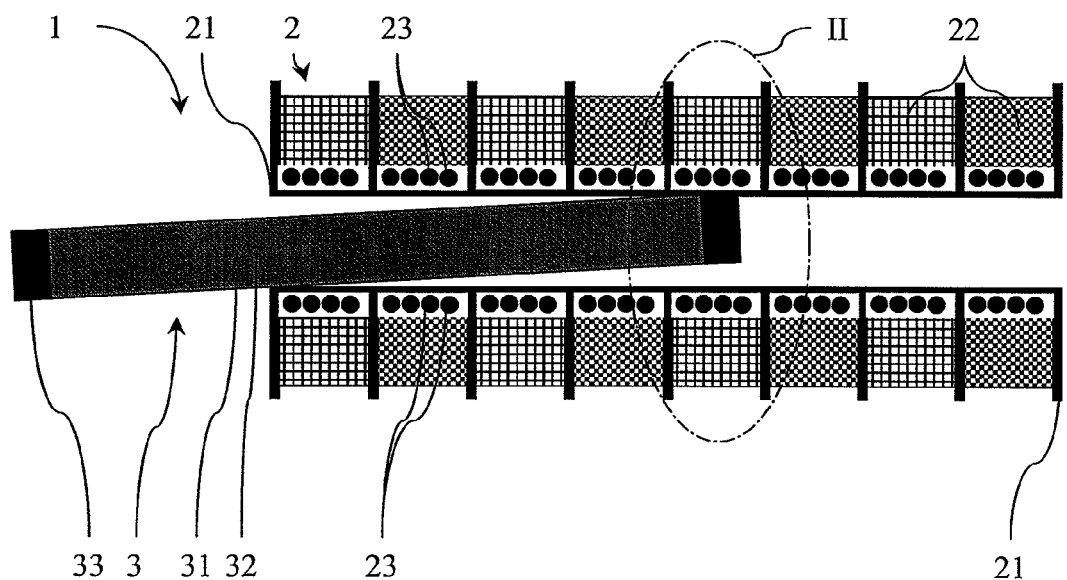
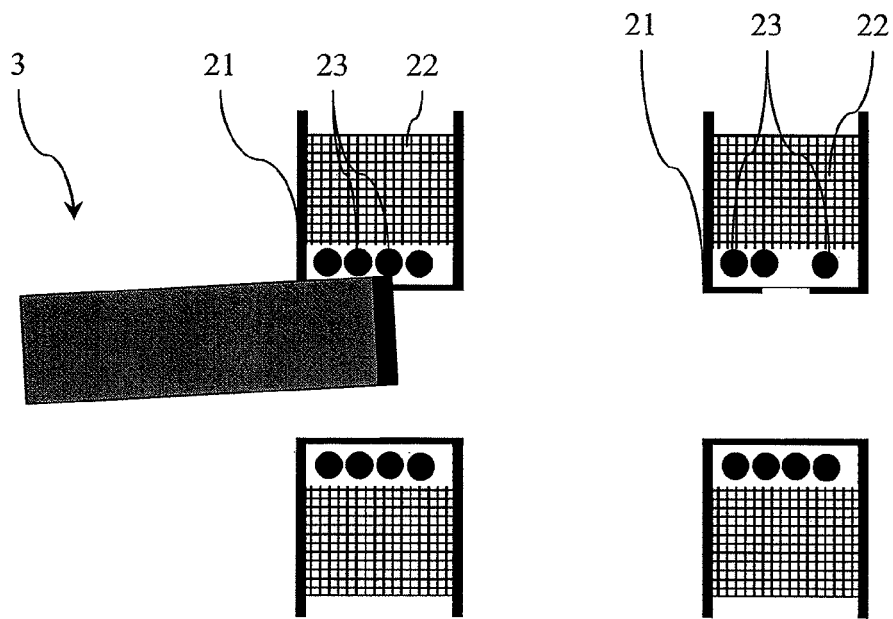
Fig. 1
Fig. 2　　　　Fig. 3

LINEAR MOTOR

CROSS-REFERENCE TO RELATED APPLICATION

This application claims priority to European Application No. 08154971.9, filed Apr. 22, 2008, the disclosure of which is incorporated herein by reference.

BACKGROUND OF THE INVENTION

The present invention relates to a linear motor in accordance with the embodiments disclosed herein.

A linear motor typically comprises a stator, a linearly movable armature as well as drive and control electronics. In order to move the armature, as a rule, either the stator or the armature is provided with excitable windings, i.e. drive windings, and, correspondingly, either the armature or the stator is provided with permanent magnetic excitation. The permanent magnetic excitation is most commonly generated by means of permanent magnets arranged in a certain manner. Whether the permanent magnets are disposed in the stator or in the armature and, accordingly, whether the excitable windings are disposed in the armature or in the stator, are determined by the desired field of use and/or the conditions there.

Linear motors may be classified into linear motors having the armature arranged on the inside, a so-called internal armature, and linear motors having the armature arranged on the outside, a so-called external armature.

In the case of a linear motor having an internal armature, the armature essentially comprises permanent magnets which generate a magnetic field with alternating polarity. A conventional embodiment of such an armature consists of a thin metal tube, e.g. of chrome steel, having a wall thickness of several tenths of a millimeter, into which disk-shaped, axially polarized neodymium magnets have been pressed, between which, if necessary, spacers made of magnetic or non-magnetic materials are placed.

The stator of a linear motor having an internal armature comprises, as a rule, a winding former which has the dual function of both carrying the drive winding and serving as a slide bearing for the armature. The distance between the armature and the winding former is kept as small as possible, typically at ⅒ mm (constructional air gap). The winding former has a wall thickness in the area of the slide bearing, which is selected as thin as possible to ensure that the gap (basically an air gap) between the drive winding and the armature does not become excessively large and, as a result, the magnetic force generated by the drive winding is not unnecessarily reduced. The wall thickness in the area of the slide bearing is typically less than one millimeter and is first of all dependent on the size of the linear motor. It is also conceivable to design the drive winding out of several winding packages, so-called air-cored coils, which are arranged together in rows and are subsequently encapsulated or bonded together, so that a protective plastic layer is formed around the drive winding. However, for manufacturing reasons, a discrete winding former is used in most cases, onto which the windings are wound or pushed as packages.

In most applications, the slide bearing has a service life which exceeds by far that of the linear motor itself. However, what may be disadvantageous are transverse forces acting on the armature, which may, depending on the wall thickness of the winding former, result in wear of the slide bearing. This may lead to the armature penetrating through the winding former in the area of the slide bearing. Such penetration will on the one hand cause a total failure of the linear motor.

However, what may be even more serious is the safety problem due to the risk of the armature coming into contact with the drive winding. Although the drive winding has insulated winding wires, typically including a varnish insulating layer, this layer has a thickness of only several hundredths of a millimeter. Thus, the varnish insulating layer may be abraded within a very short period of time and the armature will subsequently be in contact with the live drive winding, which is to be avoided in any case. Since this process proceeds at a very slow rate, the armature may at times already have the potential of the drive winding, although the linear motor is still operable. This constitutes a serious safety problem, since the drive winding of the linear motor needs to be dimensioned for large loads having high currents and high voltages, with such high currents and high voltages bearing a risk to human lives. According to the prior art it is suggested that the armature be earthed. This is, however, laborious, complex to manufacture and requires a great deal of maintenance during operation. Other possibilities include a separate voltage measurement on the armature—which is also complex—or the provision of a separate guiding mechanism for the armature externally of the winding former, which leads to an unnecessary increase in the dimensions of the linear motor and also limits the maximum possible stroke of the armature.

SUMMARY OF THE INVENTION

The present invention therefore has an object of proposing a linear motor having a stator and an armature, which does not have the above-mentioned disadvantages and in particular avoids the risk of the above-mentioned safety problem occurring, without there being any need to earth the armature.

This object is achieved by means of the linear motor according to the invention disclosed herein. Advantageous embodiment variants of the linear motor according to the invention are also disclosed.

In particular, the linear motor according to the invention comprises a stator and an armature, the stator including a winding former and a drive winding arranged on the winding former. Further, means for preventing any contact between the drive winding and the armature as the armature penetrates through the winding former are provided. In this way it may be prevented that a penetration of the armature may become a safety problem, namely if the armature comes into contact with the live drive winding and thus has the same potential as the drive winding. There is therefore no need for any complex earthing of the armature, so that such protection for the linear motor may be manufactured at low cost.

According to one embodiment of the linear motor according to the invention, the means for preventing any contact between the drive winding and the armature comprise at least one sensor winding arranged between the winding former and the drive winding. This sensor winding is supplied with a low and safe control voltage by the drive and control electronics, so that any penetration of the armature through the winding former and subsequent severing of the sensor winding will be detected by the drive and control electronics. If this is the case, the voltage applied to the winding wires of the drive winding will be switched off by the drive and control electronics. Although the linear motor will then no longer be operable, it can be prevented that the armature will have the same potential as the drive winding. Since the at least one sensor winding carries only a low current, a very small wire diameter may be used, with such a wire diameter being typically less than ⅒ mm. It therefore needs very little space, which has a positive effect on the size of the overall gap between the drive winding and the armature and thus has a positive effect on the magnetic force generated by the drive winding.

According to one embodiment of the linear motor according to the invention, the at least one sensor winding comprises exactly one sensor winding which is wound in one layer and extends in the axial direction. The space requirement of such a one-layer sensor winding extending in the axial direction is extremely low, which has a positive effect on the size of the overall gap between the drive winding and the armature and thus has a positive effect on the magnetic force generated by the drive winding.

According to a further embodiment of the linear motor according to the invention, the at least one sensor winding comprises a first and a second sensor winding, with the first and second sensor windings each being wound in one layer and extending in the axial direction, and with the winding wires of the first and second sensor windings being arranged alternately in the axial direction. Two separate sensor windings allow a better detection of any penetration of the armature through the winding former, since both an interruption of one of the two sensor windings or of both sensor windings, or a short-circuit between the two sensor windings which may be caused by the penetrating armature, may be detected. At the same time, due to the one-layer winding extending in the axial direction of the two sensor windings with an alternate arrangement of the winding wires, the gap between the drive winding and the armature is small, which has a positive effect on the magnetic force generated by the drive winding.

According to a further embodiment of the linear motor according to the invention, the at least one sensor winding comprises a first and a second sensor winding, with the first and second sensor windings each being wound in one layer and extending in the axial direction, and with the two sensor windings being arranged coaxially to one another. Two separate sensor windings again allow a good detection of any penetration of the armature through the winding former, since both an interruption of one of the two sensor windings or of both sensor windings as well as a short-circuit between the two sensor windings, caused by the penetrating armature, may be detected. Although the coaxial, in each case one-layered, arrangement of the two sensor windings leads to a larger radial constructional dimension compared to a one-layer sensor winding, through the avoidance of any contact of the live drive winding through the armature a higher safety level is achieved.

According to a further embodiment of the linear motor according to the invention, a protective layer against any mechanical damage to the drive winding is arranged between the at least one sensor winding and the drive winding. While the sensor winding(s) ensure(s) that any penetration of the armature will be detected, the protective layer against mechanical damage additionally enhances the safety level by preventing any contact of the live drive winding through the armature. What is of advantage here as well is that any penetration of the armature will reliably be detected, because the sensor winding will have been severed, but that the protective layer will prevent any contact between the armature and the drive winding. Particularly in the case of two sensor windings and a protective layer, both a possible interruption of one or both of the sensor windings and a short-circuit between the two sensor windings may be detected, and the protective layer prevents any contact between the armature and the drive winding.

According to a further development of the last-mentioned embodiment of the linear motor according to the invention, the protective layer comprises a flexible printed circuit board having applied thereon at least one sensor winding and having disposed thereon the at least one sensor winding in the form of conductive tracks. A flexible printed circuit board having conductive tracks disposed thereon, e.g. of copper, is a simple and non-complex solution for providing both the protective layer against mechanical damage and the sensor winding.

As mentioned already, the armature may be either an internal armature or an external armature. According to a specific embodiment of the linear motor according to the invention, however, the armature is an internal armature.

According to a further advantageous embodiment of the linear motor according to the invention, the at least one sensor winding comprises a first and a second sensor winding, with the first and second sensor windings being arranged axially opposite each other externally of the winding former. A positioning of the first and second sensor windings externally of the winding former will prevent any contact between the drive winding and the armature in case the armature penetrates through the winding former, since the armature is supported externally of the winding former. This arrangement principally separates the support of the armature from the winding former and also from the stator. This requires that the armature ends may never enter completely into the stator, otherwise the armature will no longer be reliably supported. Thus for this embodiment, the maximum stroke of the armature is limited.

BRIEF DESCRIPTION OF THE DRAWINGS

The linear motor according to the invention will be described in more detail below with reference to the attached drawings by way of five embodiments, wherein:

FIG. 1 shows a longitudinal section through a first embodiment of a linear motor according to the invention having one sensor winding;

FIG. 2 shows section II of the embodiment from FIG. 1 with an armature which has penetrated through the winding former;

FIG. 3 shows section II from FIG. 2 with a severed sensor winding (without an armature);

DESCRIPTION OF THE PREFERRED EMBODIMENTS

Figure 4:
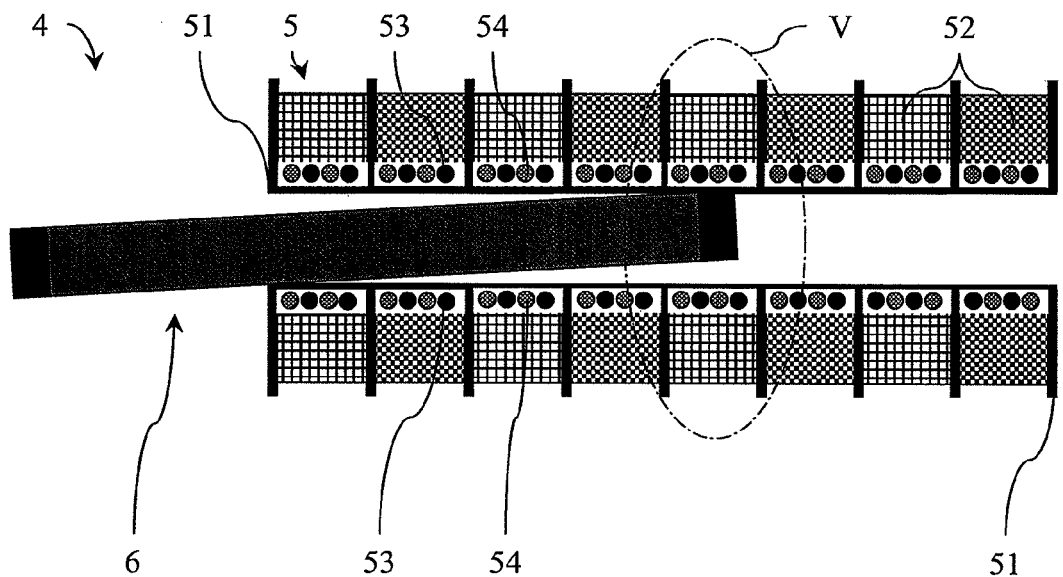
FIG. 4 shows a longitudinal section through a second embodiment of a linear motor according to the invention having a first and a second sensor winding which are alternately arranged.
Figures 5, 6, 7:
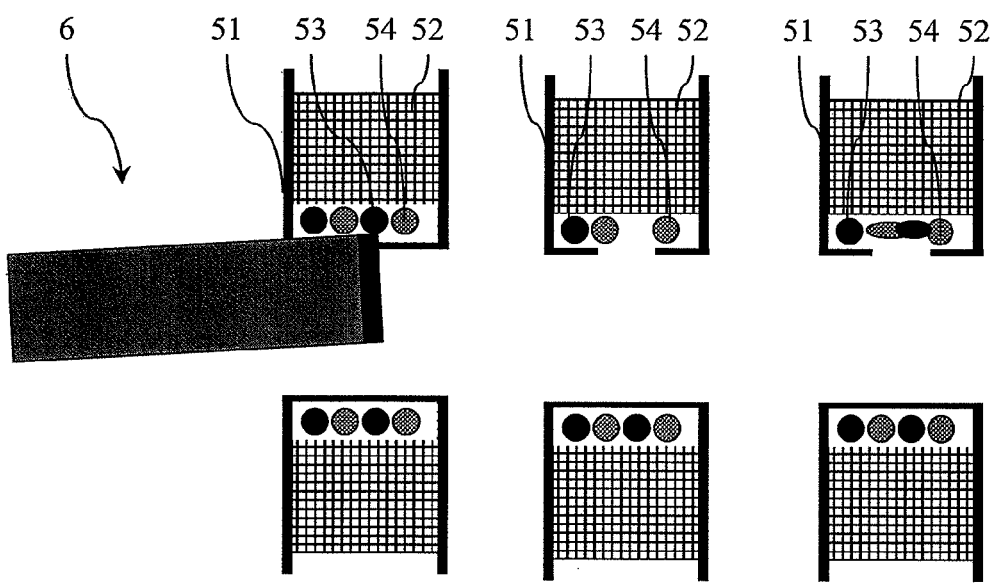
FIG. 5 shows section V of the embodiment of FIG. 4 with an armature that has penetrated the winding former.
FIG. 6 shows section V from FIG. 5 with a severed first sensor winding (without an armature)
FIG. 7 shows section V from FIG. 5 with a short-circuit between the first and second sensor windings (without an armature)
Figure 8:
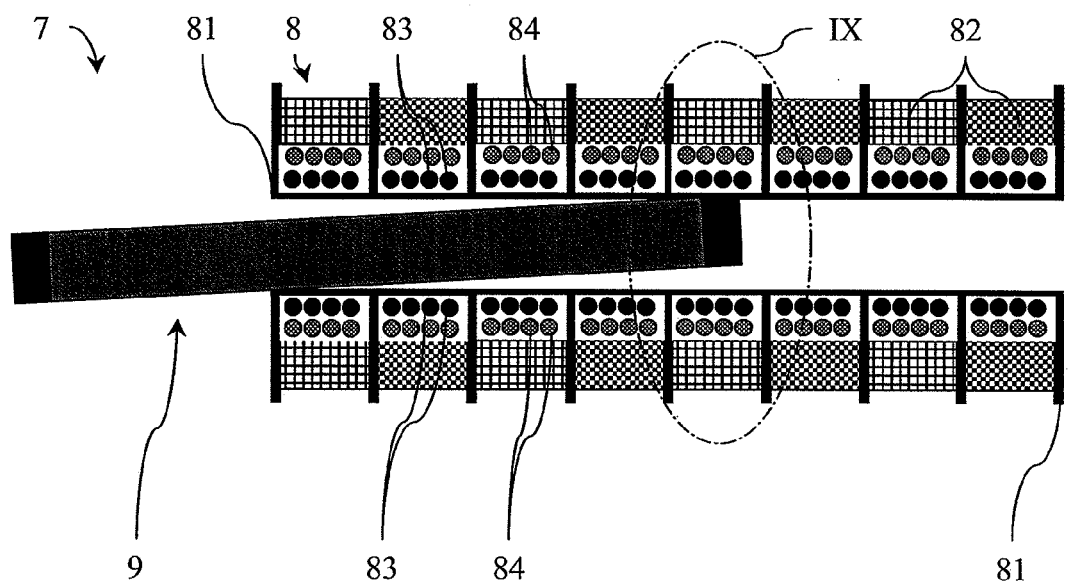
FIG. 8 shows a longitudinal section through a third embodiment of a linear motor according to the invention with a first and a second sensor winding, which are arranged coaxially to one another.
Figures 9, 10, 11:
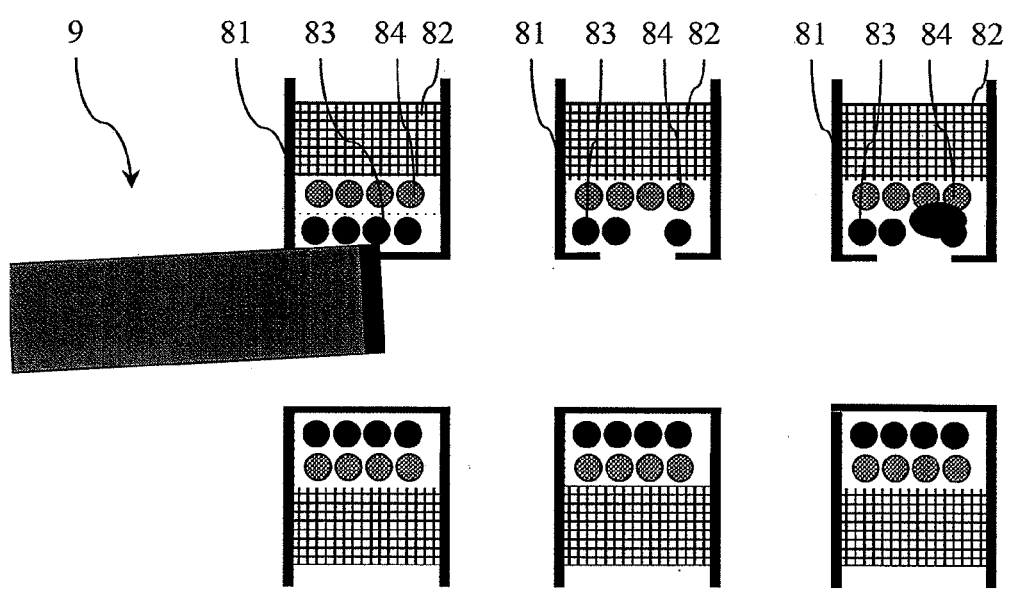
FIG. 9 shows section IX of the embodiment from FIG. 8 with an armature which has penetrated the winding former.
FIG. 10 shows section IX from FIG. 9 with a severed first sensor winding (without an armature)
FIG. 11 shows section IX from FIG. 9 with a short-circuit between the first and second sensor windings (without an armature)

According to the first embodiment illustrated in FIGS. 1-3, the linear motor 1 according to the invention comprises a stator 2 and an armature 3. The stator 2 comprises a winding former 21 and a drive winding 22 laid on top of the latter. Between the winding former 21 and the drive winding 22, a sensor winding 23 is provided which is wound in one layer and extends in an axial direction over the entire length of the winding former 21.

The armature 3 comprises a thin metal tube 31, e.g. of chrome steel, the wall thickness of which is several tenths of a millimeter and which has disk-shaped, axially polarized neodymium magnets pressed into its internal space 32, between which, if necessary, spacers of magnetic or non-magnetic materials may be placed. The drive winding 22 is driven by means of drive and control electronics (not shown) in such a way that the armature 3 may be moved within the stator 2 in an axial direction. Further, the armature 3 has armature ends 33 which have the same external diameter as the metal tube 31.

The winding former 21 is not only used as a support for the drive winding 22 and the sensor winding 23, but also as a slide bearing for the armature 3. The distance between the armature and the winding former is kept as small as possible and is typically e.g. 1/10 mm. The winding former 21 has a wall thickness in the area of the slide bearing, which is selected as thin as possible in order to avoid an unnecessary reduction of a magnetic force generated by the drive winding 22. The wall thickness in the area of the slide bearing is typically less than one millimeter and is first of all dependent on the size of the linear motor. The winding former 21 is made from a plastics material having a good sliding property, so that the bearing has a long service life.

Any transverse forces acting on the armature 3 may, depending on the wall thickness of the winding former 21 in the area of the slide bearing, lead to wear of the slide bearing. In an extreme case, this may result in the armature 3 penetrating through the winding former 21 in the area of the slide bearing. In the case of such penetration, the armature 3 will impinge on the sensor winding 23 (see FIG. 2), which is arranged, wound in one layer, between the winding former 21 and the drive winding 22. Before the armature 3 comes into contact with the drive winding 22, the sensor winding 23 will be severed in at least one place (see FIG. 3). Such severing of the sensor winding 23 will be detected by the drive and control electronics and will cause the drive winding 22 to be switched off. Although the linear motor 1 will then no longer be operable, any possibility of the armature 3 coming into contact with the drive winding 22 will be avoided reliably. Thus it may be prevented that the armature 3 has the potential of the drive winding 22, which depending on the current and voltage of the drive winding 22 may be dangerous.

According to the second embodiment illustrated in FIGS. 4-7, the linear motor 4 according to the invention has a stator 5 and an armature 6. The stator 5 comprises a winding former 51 and a drive winding 52 arranged thereon. Between the winding former 51 and the drive winding 52, there are a first sensor winding 53 and a second sensor winding 54, which are each wound in one layer and extend in the axial direction over the entire length of the winding former 51. The winding wires of the first 53 and second 54 sensor windings are alternately arranged in the axial direction.

In the case of the armature 6 penetrating through the winding former 51 (see FIG. 5), the armature 6 will impinge on at least one of the first 53 and second 54 sensor windings. Before the armature 6 comes into contact with the drive winding 52, at least either the first sensor winding 53 or the second sensor winding 54 or both will be severed in at least one location (see FIG. 6). Also possible is a short-circuit between the first 53 and second 54 sensor windings (see FIG. 7). Such severing of the first 53 or the second 54 sensor winding or a short-circuit between the first 53 and second 54 sensor windings will be detected by the drive and control electronics and will result in the drive winding 52 being switched off. Although the linear motor 4 will then no longer be operable, any possibility of the armature 6 coming into contact with the drive winding 52 will surely be avoided.

In the third embodiment illustrated in FIGS. 8-11, the linear motor 7 according to the invention comprises a stator 8 and an armature 9. The stator 8 comprises a winding former 81 and a drive winding 82 arranged thereon. Between the winding former 81 and the drive winding 82, there are a first sensor winding 83 and a second sensor winding 84 which are each wound in one layer and extend over the entire length of the winding former 81. The two sensor windings 83, 84 are arranged coaxially to one another.

In case the armature 9 penetrates through the winding former 81 (see FIG. 9), the armature 9 will impinge on the first sensor winding 83. Before the armature 9 comes into contact with the drive winding 82, the first sensor winding 83 will be severed (see FIG. 10). Also possible is a short-circuit between the first 83 and the second 84 sensor windings (see FIG. 11). Such severing of the first sensor winding 83 or a short-circuit between the first 83 and second 84 sensor windings will be detected by the drive and control electronics and will cause the drive winding 82 to be switched off. Although the linear motor 7 will then no longer be operable, any possibility of the armature 9 coming into contact with the drive winding 82 will be reliably avoided. Although no severing of the second sensor winding is shown in FIGS. 8-11, this will also be detected by the drive and control electronics.

Figure 12:
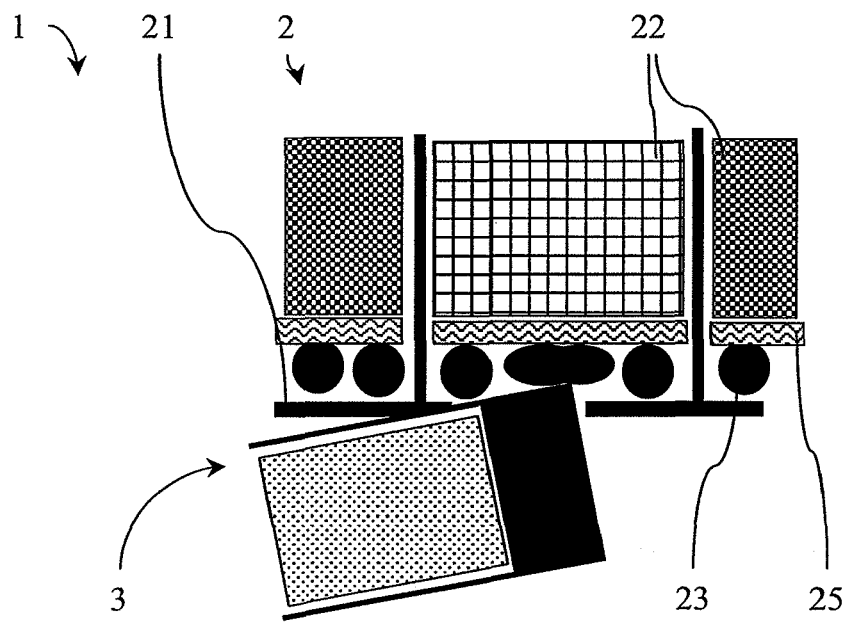
FIG. 12 shows a sectional view of a cut-out from a fourth embodiment of a linear motor according to the invention with a sensor winding and a protective layer against mechanical damage.

The fourth embodiment illustrated in FIG. 12 essentially corresponds to the embodiment according to FIG. 1. The significant difference with this embodiment is that a protective layer 25 against mechanical damage is provided between the sensor winding 23 and the drive winding 22, which enhances the safety level of the live drive winding 22 through the armature 3 and which is electrically non-conductive.

The protective layer 25 against mechanical damage may e.g. be an insulating film having a layer thickness of approximately 1/10 mm. A flexible printed circuit board having conductive tracks applied thereon, e.g. of copper, is a simple and non-complex solution for providing the protective layer 25 against mechanical damage and the sensor winding 23, and the windings of the sensor winding 23 may be applied on the printed circuit board e.g. in a meander-like fashion.

A protective layer 25 against mechanical damage may also be realized as a variant in the second embodiment (see FIGS. 4-7) and in the third embodiment (see FIGS. 8-11). Also conceivable in the second and the third embodiment is the use of a flexible printed circuit board with conductive tracks deposited thereon.

Figure 13:
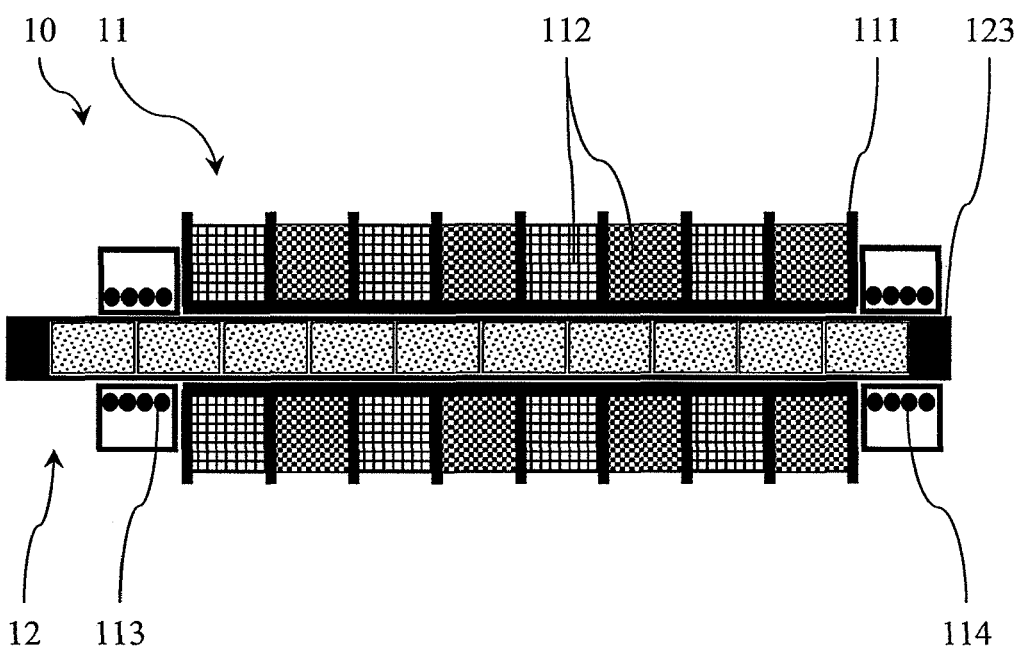
FIG. 13 shows a longitudinal section through a fifth embodiment of a linear motor according to the invention with a first and a second sensor winding, which are arranged axially opposite to one another externally of the winding former.

According to the fifth embodiment illustrated in FIG. 13, the linear motor 10 according to the invention comprises a stator 11 and an armature 12. The stator 11 comprises a winding former 111 and a drive winding 112 arranged thereon. A first sensor winding 113 and a second sensor winding 114 are each arranged opposite each other externally of the winding former 111. The sensor windings 113, 114 may each be embodied with two wires, so that not only a severing of one sensor winding but also a short-circuit between the two wires may be identified.

The armature 12 is provided with armature ends 123. In this embodiment, the maximum stroke of the linear motor should be selected such that the respective armature end 123 is not moved completely through the associated sensor winding 113, 114 towards the winding former 111 in an axial direction.

Further design variations of the above-described linear motors may be realized. In particular, the following is conceivable:

- a linear motor without a winding former, which has encapsulated air-cored coils with at least one sensor winding;
- a linear motor without a winding former, wherein packages with drive windings are pushed onto a tube, and which has at least one sensor winding; and
- a linear motor having one sensor winding in the form of a coating which is directly applied onto the winding former.

The invention claimed is:

1. A linear motor having a stator and an armature, with the stator having a winding former and further having a drive winding arranged on the winding former, wherein means are provided for preventing any contact between the drive winding and the armature in the case of the armature penetrating through the winding former.

2. Linear motor according to claim 1, wherein the means for preventing any contact between the drive winding and the armature comprise at least one sensor winding which is arranged between the winding former and the drive winding.

3. Linear motor according to claim 2, wherein the at least one sensor winding comprises exactly one sensor winding which is wound in one layer and extends in an axial direction.

4. Linear motor according to claim 2, wherein the at least one sensor winding comprises a first and a second sensor winding, with the first and second sensor windings each being wound in one layer and extending in an axial direction, and with the winding wires of the first and second sensor winding being alternately arranged in an axial direction.

5. Linear motor according to claim 2, wherein the at least one sensor winding comprises a first and a second sensor winding, with the first and second sensor windings each being wound in one layer and extending in an axial direction, and with the two sensor windings being arranged coaxially to one another.

6. Linear motor according to claim 2, wherein a protective layer against mechanical damage to the drive winding is provided between the at least one sensor winding and the drive winding.

7. Linear motor according to claim 6, wherein the protective layer comprises a flexible printed circuit board upon which the at least one sensor winding is applied.

8. Linear motor according to claim 7, wherein the at least one sensor winding is provided in the form of conductive tracks on the flexible printed circuit board.

9. Linear motor according to claim 1, wherein the armature is an internal armature.

10. Linear motor according to claim 1, wherein the at least one sensor winding comprises a first and a second sensor winding, with the first and the second sensor windings being arranged opposite each other externally of the winding former.

11. Linear motor according to claim 1, wherein the contact occurs from transverse forces acting on the armature.

* * * * *